United States Patent
Lakin et al.

(10) Patent No.: US 8,533,760 B1
(45) Date of Patent: Sep. 10, 2013

(54) REDUCED LATENCY CHANNEL SWITCHING FOR IPTV

(75) Inventors: James Lakin, Roswell, GA (US); Thomas Cloonan, Lisle, IL (US)

(73) Assignee: Arris Enterprises, Inc., Suwanee, GA (US)

( * ) Notice: Subject to any disclaimer, the term of this patent is extended or adjusted under 35 U.S.C. 154(b) by 91 days.

(21) Appl. No.: 12/908,343

(22) Filed: Oct. 20, 2010

Related U.S. Application Data (60) Provisional application No. 61/253,272, filed on Oct. 20, 2009.

(51) Int. Cl.
*G06F 3/00* (2006.01)

(52) U.S. Cl.
USPC .......... 725/51; 725/86; 725/93; 725/94; 725/95; 725/100; 348/38; 348/385.1; 348/388.1; 348/E11.003; 370/252; 370/389; 370/486

(58) Field of Classification Search
None
See application file for complete search history.

(56) References Cited

U.S. PATENT DOCUMENTS

| | | | |
|---|---|---|---|
| 2005/0047429 A1* | 3/2005 | Koo et al. | 370/447 |
| 2005/0053086 A1* | 3/2005 | Mehta et al. | 370/432 |
| 2006/0075428 A1* | 4/2006 | Farmer et al. | 725/38 |
| 2007/0242666 A1* | 10/2007 | Barrett | 370/389 |
| 2008/0134249 A1* | 6/2008 | Yang et al. | 725/46 |
| 2008/0209499 A1* | 8/2008 | Ramesh et al. | 725/138 |
| 2009/0013362 A1* | 1/2009 | Liu et al. | 725/110 |
| 2009/0083813 A1* | 3/2009 | Dolce et al. | 725/93 |
| 2009/0165043 A1* | 6/2009 | Ou et al. | 725/38 |
| 2010/0183285 A1* | 7/2010 | Heath et al. | 386/109 |
| 2010/0184395 A1* | 7/2010 | Bagge et al. | 455/161.1 |
| 2010/0329328 A1* | 12/2010 | Kontola et al. | 375/240.02 |
| 2012/0059845 A1* | 3/2012 | Covell et al. | 707/769 |

FOREIGN PATENT DOCUMENTS

WO  WO 2007086869 A1 *  8/2007

\* cited by examiner

*Primary Examiner* — Nasser Goodarzi
*Assistant Examiner* — Paul Graham
(74) *Attorney, Agent, or Firm* — Troy A. Van Aacken (57) ABSTRACT

Systems and methods can be used to provide reduced latency in channel changing for interactive programming. In some implementations, such systems and methods can include identifying a rapid channel change mode and filtering older requests when a device detects the rapid channel change mode. In other implementations, such systems and methods can predict channel change requests and identify predicted channels associated with the predicted requests. The predicted channels can thereby be requested in advance.

20 Claims, 5 Drawing Sheets

REDUCED LATENCY CHANNEL SWITCHING FOR IPTV

RELATED APPLICATIONS

This application claims priority to, and the benefit of, U.S. Provisional Patent Application Ser. No. 61/253,272, entitled "Reduced Latency Channel Switching for IPTV," filed Oct. 20, 2009, the entirety of which is hereby incorporated by reference.

TECHNICAL FIELD

This disclosure relates to channel switching for television programming.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD), internet protocol television (IPTV) and video conferencing traffic signals, among other types.

IPTV uses a traditional internet protocol (IP) network to deliver audio and video content to users. IPTV can be delivered via existing cable infrastructure from MSOs, digital subscriber lines (xDSL), integrated service digital network (ISDN), public switched telephone networks, or T1 connections from telecommunications operators or internet service providers, satellite from satellite operators, or wireless services (such as, e.g., cellular, 802.11 or Wi-MAX standards) from wireless service providers, among many others. One metric for consumer use of IPTV is termed quality of experience (QoE). One parameter that can be associated with QoE is channel switching time. Channel switching time can be identified as the delay between a new channel request by the user and an image display of the requested channel on the screen. Typically, users who rapidly change channels are required to wait some period of time before the image appears on the screen. Then, when multiple channels are requested through the MSO over a hybrid fiber-cable (HFC) network within a short period of time, the network can become overloaded thereby straining resources.

BRIEF DESCRIPTION OF THE DRAWINGS

Like reference numbers and designations in the various drawings indicate like elements.

DETAILED DESCRIPTION

In some implementations of this disclosure, systems and methods can operate to filter channel change requests based upon identification of multiple channel change requests over a relatively short period of time. For example, if a user clicks a channel change multiple times within a short duration (e.g., a second) and multiple "join" messages are queued, then a reduced latency channel switching control logic can drop some or all of the older "join" message(s) and send one or more of the most recent channel request(s).

In other implementations of this disclosure, systems and methods can operate to identify eligibility for reduced latency channel switching control logic by predicting channel change requests. For example, if a user performs channel changes in a recognizable pattern over a given time period, the reduced latency channel switching control logic in the CPE device can identify the behavior as a serial or rapid channel changer. Systems and methods of this disclosure can operate to identify, based on information generated from past user inputs and reduced latency channel switching control logic, the channel predictions in anticipation of user actions.

In some implementations, channel change requests can be in the form of "join" messages. For example, if user has been serially clicking an "up" channel change button and the timing pattern was determined to be more than one click per second, the reduced latency channel switching control logic will send "join" message(s) to the system resource manager (SRM) to provide a calculated number of channels in an "up" direction ahead of anticipated channel change command from the user.

Additionally, systems and methods of this disclosure can also operate to identify which of one or more channels associated with a channel change command are eligible for elimination from the queue. For example, after a user is determined to be a serial or rapid channel changer in a single direction, the reduced latency channel switching control logic can discard older channel change commands ("join"/"leave" message(s)), and jump immediately to the most recently queued message.

Moreover, systems and methods of this disclosure can operate to identify when a user skips by a previously requested channel (e.g., a channel actually requested by the user or a predicted channel by the channel switching control logic) and ceases transmission of that channel by sending a "leave" message to the SRM. For example, if the channel switching control logic predicts channels that are requested by the CPE device, and are subsequently skipped by the user, the channel switching control logic can stop transmission of the previously requested predicted channels by sending a "leave" message for the skipped channels.

In additional implementations, systems and methods of this disclosure can operate to identify when a user status as serial or rapid channel changer is no longer valid. When the user ceases to be identified as a serial or rapid channel changer, the CPE device can cease requesting predicted channels from the SRM. Thus, for example, if the CPE device has determined a user is a serial or rapid channel changer and the channel changes becomes unpredictable by the control logic, the user will not be considered a serial or rapid channel changer and the CPE device will cease sending predicted channel requests.

Figure 1:
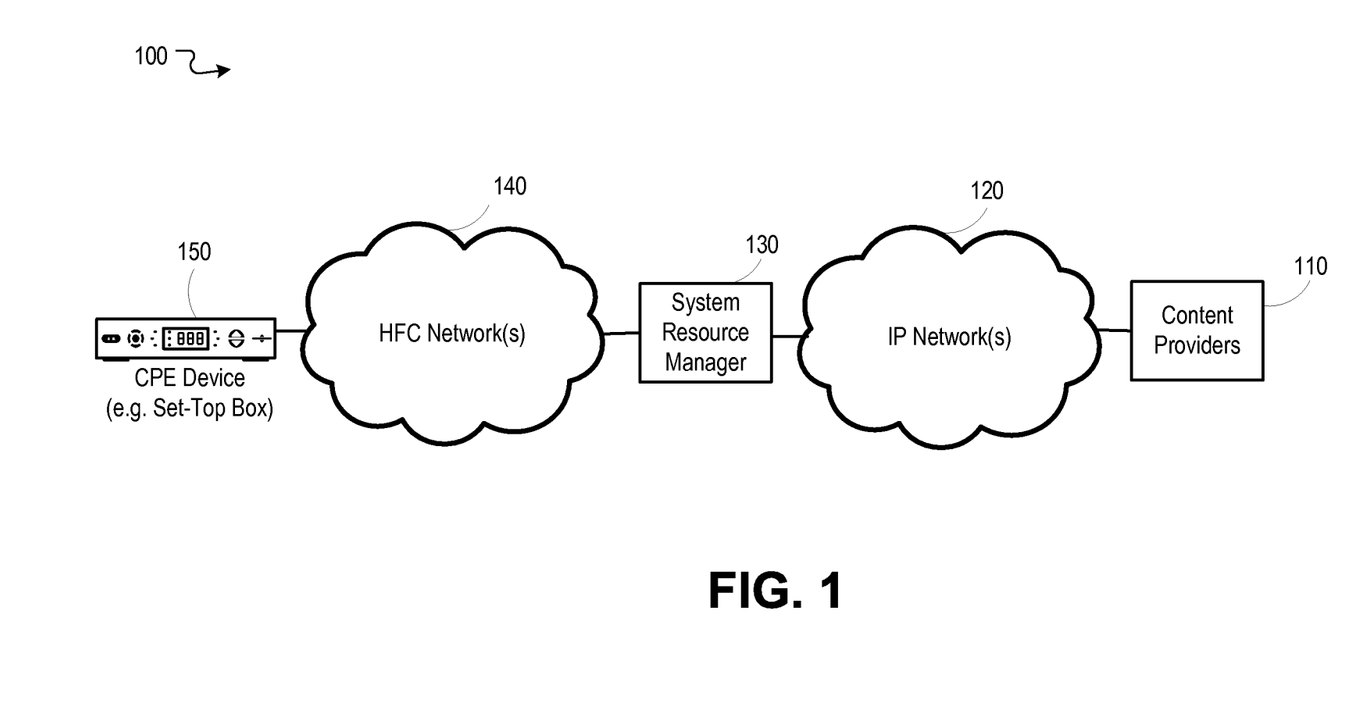
FIG. 1 is a block diagram illustrating an exemplary network environment operable to provide reduced latency channel switching.

FIG. 1 is a block diagram illustrating an exemplary network environment 100 operable to provide reduced latency channel switching. In some implementations, content providers 110 can provide video service (e.g., IP based video service) to a subscriber. For example, content providers 110 can consist of broadcast agencies and video-on-demand servers (e.g., including internet video sources). Content providers 110 can typically send video source (or sources) through an IP network(s) 120 to the SRM 130.

In some implementations, the SRM 130 can be a cable television headend and can include devices such as an edge quadrature amplitude modulation (EQAM) device and/or a cable modem termination system (CMTS). In still further implementations, the SRM 130 can be a telecommunications headend and can include a digital subscriber line access multiplexer (DSLAM). The SRM 130 can typically operate to transmit video streams can be through an HFC network (or networks) 140 to a CPE device 150 (e.g., set-top box (STB)). The video streams processed by the SRM 130 can enter the system, in some implementations, as raw moving picture experts group (MPEG) streams, or any other streaming video protocol supported by the SRM 130. The CPE DEVICE 150 can be provided to a subscriber for receiving and decoding the video signals provided by the SRM 130 via the HFC network(s) 140.

Data services can be handled by the CPE device 150, SRM 130, and content providers 110. The SRM 130 can receive channel data (e.g., including video data) from content providers 110. In some examples, the channel data can be transmitted over an IP network(s) 120. In still further examples, one or more video sources may provide streaming data through an external or third party network to the SRM 130.

The SRM 130 can exchange channel and control data with the CPE device 150. The SRM 130 can send viewed channel(s) through an HFC network 140 or another external network (e.g., the Internet) to the CPE device 150. In some implementations, the SRM 130 can send data as defined by DOCSIS. In other implementations, the SRM 130 can send video data as video streams comprising raw moving MPEG streams. The SRM 130 can send and receive data signals from the CPE device 150 through an HFC network 140 or another external network (e.g., the Internet). The SRM 130 can forward streaming packets to the CPE device 150 in both multicast and unicast (e.g., point-to-point) formats to one or more cable modems and/or set top boxes.

Reduced latency channel switching control logic can be provided by different devices in the network. In some implementations, the reduced latency channel switching control logic can reside in the CPE device 150 at the user site. In other implementations, the reduced latency channel switching control logic can reside in a distributed device that resides between the CPE device 150 and the headend. In still other implementations, the reduced latency channel switching control logic can reside in the SRM 130 or separate device networked to the SRM 130.

As discussed above, in some implementations, reduced latency channel switching control logic can operate to filter channel change requests based upon identification of multiple channel change requests over a relatively short period of time. For example, if a user clicks a channel change multiple times within a short duration (e.g., a second) and multiple "join" messages are queued, then a reduced latency channel switching control logic can drop some or all of the older "join" message(s) and send one or more of the most recent channel request(s).

In other implementations, reduced latency channel switching control logic can operate to identify eligibility for reduced latency channel switching control logic by predicting channel change requests. For example, if a user performs channel changes in a recognizable pattern over a given time period, the reduced latency channel switching control logic in the CPE device can identify the behavior as a serial or rapid channel changer. The reduced latency channel switching control logic can operate to identify channel predictions in anticipation of user actions. Such channel predictions can be based on information generated from past user inputs and reduced latency channel switching control logic.

Figure 2:
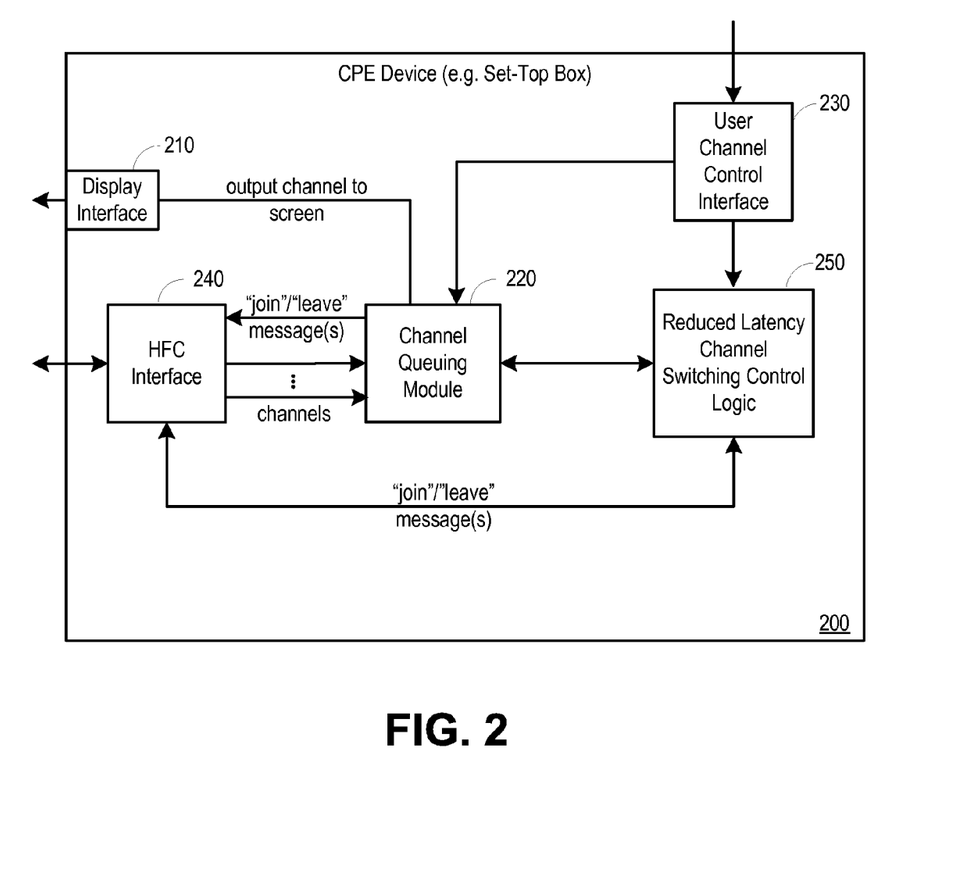
FIG. 2 is a block diagram illustrating a CPE device providing reduced latency channel switching.

FIG. 2 is a block diagram illustrating a CPE device 200 (e.g. a STB) including reduced latency channel switching control logic. The CPE device 200 can include a display interface 210 to output the channel to the screen, a channel queuing module 220, a user channel control interface 230, an HFC interface 240, and a reduced latency channel switching control logic 250.

The HFC interface 240 can operate to receive communications from an external network (e.g., the Internet) and to send communications to devices residing on the external network. In some implementations, another networking interface, such as Ethernet or fiber optics, can serve to receive and send communications to external devices. In still further implementations, the HFC interface 240 can be set up to use any of a variety of networking communication protocols, e.g., based upon the protocol(s) used by the external network. The HFC interface 240 can also be coupled to the channel queuing module 220 to send control signals and receive video signals. The HFC interface 240 can also be coupled to the reduced latency channel switching control logic 250 to send or receive control signals (e.g., "join"/"leave" messages, etc.).

Input to the user channel control interface 230 can be received from an associated remote control. In other implementations, the signal input to the user channel control interface 230 can be from other external controls such as commands from networked devices, or other I/O devices such as a mouse or touchscreen display. The user channel control interface 230 can be coupled to various modules and/or logic within the CPE device 200. The user channel control interface 230 can be coupled to the reduced latency channel switching control logic 250 facilitating the identification of a serial clicking mode and/or click prediction. In some implementations, the user channel control interface 230 can also be coupled to the channel queuing module 220. In other implementations, the user channel control interface 230 can communicate with the channel queuing module 220 via the reduced latency channel switching control logic 250.

The channel queuing module 220 can buffer and store "join" and "leave" messages. In some implementations, the channel queuing module 220 can buffer and store "join" and "leave" messages at the instruction of the reduced latency channel switching control logic 250. In other implementations, all incoming "join" and "leave" messages can be queued before transmission to a headend. The channel queuing module 220 can also be connected to the HFC interface 240 or other network interface to send "join" and "leave" messages and receive channel data. The channels can be output to a screen via display interface 210 or other output device. In addition, the channel queuing module 220 can discard "join" and "leave" messages based upon input from the reduced latency channel switching control logic 250. In some implementations, the channel queuing module 220 can integrate parts or all of the functionality of the reduced latency channel switching control logic 250.

The reduced latency channel switching control logic 250 can include the control logic operable to implement filtering of channel change requests and/or prediction of channel change requests. The reduced latency channel switching control logic 250 can receive signals from a user via user channel control interface 230 and can send control signals to and receive feedback from the channel queuing module 220. The channel queuing module 220 and/or the reduced latency channel switching control logic 250 can send control signals to external devices via the HFC interface 240. In some implementations, the reduced latency channel switching control logic 250 can be distributed within other modules included in the CPE device 200, or external devices that communicate with the CPE device 200, including e.g., a distribution device residing between the SRM and the CPE device 200, within the SRM, or within any other network element.

In some implementations, the reduced latency channel switching control logic 250 can operate to filter channel change requests. In such implementations, the user channel control interface 230 can receive an incoming request for channels (e.g., a "join" message) from the user via a remote control or other I/O device. The "join" message can be buffered within the channel queuing module 220.

In some implementations, the reduced latency channel switching control logic 250, upon detecting that one or more requests are made while requests remain inside the channel queuing module 220, can issue a command to the channel queuing module 220 to filter the outgoing requests by dropping one or more of the "join" messages from the queue. In a typical scenario, the reduced latency channel switching control logic logic 250 can instruct the channel queuing module 220 to drop all requests for channels except the last request made. In various implementations, the reduced latency channel switching control logic 250 can also notify upstream network elements to drop the communication, thereby canceling "join" messages that have already been sent from the channel queuing module 220.

In some implementations, the channel queuing module 220 can delay sending any channel change request for a designated period of time to allow rapid queued channel requests to be filtered. In other implementations, the channel queuing module 220 can enter a rapid channel change mode prior to instructing the channel queuing module 220 to delay sending channel change requests for a designated period of time. Thus, for example, channel change requests can be delayed after multiple successive channel change requests have been received in rapid succession. In such examples, if a delayed channel change request is determined by the reduced latency channel switching control logic to be preempted by another channel change request, the previous channel change request can be dropped prior to sending the previous channel change request to an SRM (e.g. system resource manager 130 of FIG. 1), headend, or content provider (e.g. content providers 110 of FIG. 1).

In some implementations, the reduced latency channel switching control logic 250 can predict channel change requests in advance of receipt of the channel change requests. In such implementations, the user channel control interface 230 can receive incoming request for channels from the user via a remote control. The channel requests can be buffered using the channel queuing module 220 and can be monitored by the reduced latency channel switching control logic 250. If a serial or rapid channel change is detected in a predictable, recognized pattern, the reduced latency channel switching control logic 250 can calculate a predictive window based on the frequency of channel changes over a given period of time. In addition, the reduced latency channel switching control logic 250 can identify one or more predicted channels based on various user patterns. It should be understood that the calculation of the predictive window, predicted channels and determination of a serial or rapid channel changer can occur sequentially or simultaneously. In addition, the predictive window and predicted channels can be dynamic and can change during the viewing process.

Once calculated, the reduced latency channel switching control logic 250 can send the channel queuing module 220 one or more additional channel request based on predictive window calculation and predicted channel progression. For example, if a user in serial or rapid channel change mode is making at least one click per second, then the predictive window calculation may request two additional predicted channels. In another example, if the same user in serial or rapid channel change mode increases the frequency of clicking to at least two clicks per second, then the predictive window calculation may request four additional predicted channels.

The predicted channels can be provided by the reduced latency channel switching control logic 250 based upon identification of patterns in a users behavior. In one implementation, the predicted channels are selected on the basis of directional and adjacent channels. For example, if a user was consistently pressing the "up" channel button, for instance, cycling through channels 006, 007, 008, and 009, then based on the frequency of the channel changes, the predicted channels might include channels 010, 011, and 012.

In still further implementations, the predicted channels can be identified based upon the last requested channel combined with a history of the channels most frequently requested after that channel. For example, if the user's last selection was for channel 003, and the user's channel change request history indicates that the user most often selects channels 004, 009 and 016 after selecting channel 003, the reduced latency channel switching control logic 250 can send predictive requests for channels 004, 009 and 016. In other examples, the user may be switching back and forth between two channels. In such an example, the reduced latency channel switching control logic 250 can hold off on sending a "leave" message until the user has exited serial or rapid channel change mode.

In still other implementations, the reduced latency channel switching control logic 250 can predict a series of channel changes based upon a current channel. For example, if a CPE device is currently tuned to channel 003, and the reduced latency channel switching control logic 250 identifies that channel 006 is the channel most often visited after channel 003, the reduced latency channel switching control logic 250 can then determine which channel is most often visited after channel 006. Thus, the reduced latency channel switching control logic 250 can predict an ordered series of channel changes based upon each successive most likely channel change request after a current channel.

In some implementations, the number of predicted channels can be based upon the predictive window calculated by the channel change request frequency associated with the user and CPE device. For example, if the CPE device receives two channel changes per second, the reduced latency channel switching control logic 250 can retrieve the four most frequently visited channels after the current channel. Thus, it should be understood that the predictive window can continually be calculated by the number of clicks over a given period of time.

Once identified as a serial or rapid channel changer and following the predictive requests, "leave" messages can be issued to the channel queuing module 220 when a predicted channel is skipped or is no longer a predicted channel. If the serial or rapid clicking behavior ceases because the frequency of channel changes has slowed substantially or the reduced latency channel switching control logic 250 is unable to predict channels, then "leave" messages can be issued to the channel queuing module 220 for all predicted channels and/or the predictive window can be closed until serial or rapid channel change behavior is detected again.

Figure 3:
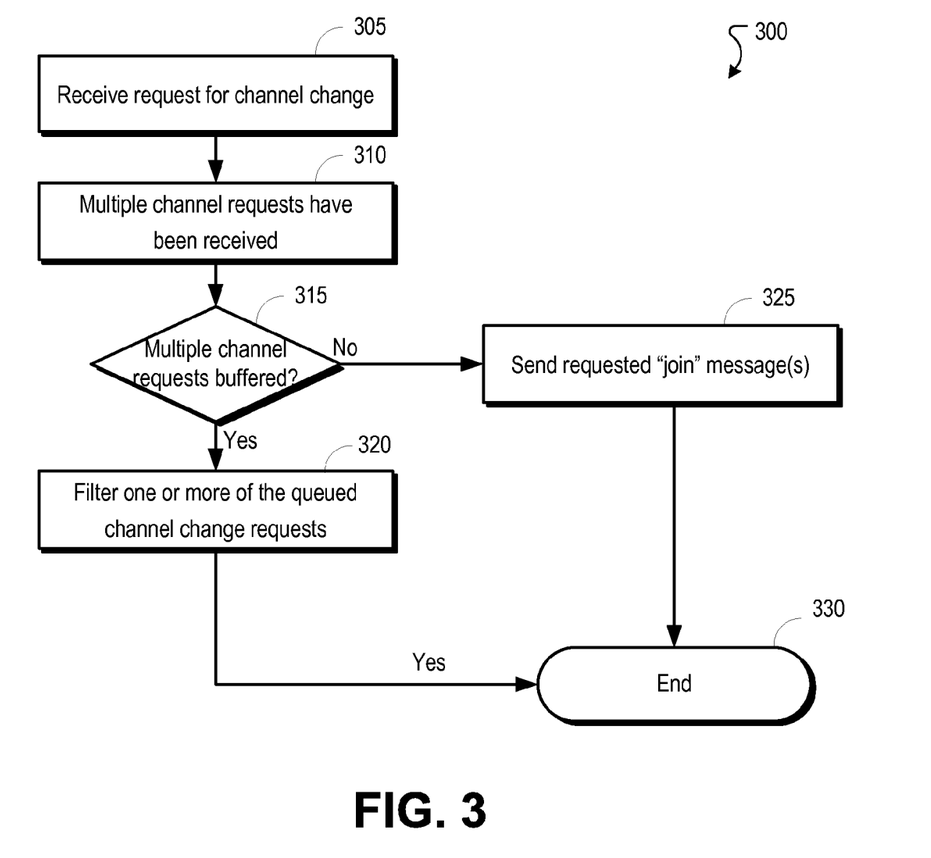
FIG. 3 is a flowchart illustrating an example process for providing reduced latency channel switching for IPTV.

FIG. 3 is a flowchart illustrating an example process 300 for queuing and filtering channel change requests. The process 300 can begin at stage 305 when a request for channel change is received. The channel change can be received, for example, by a remote control interface (e.g., remote control interface 230 of FIG. 2). In various examples, the channel change request can be originated by a remote control from the user, or at a network device, for example, by an external network interface.

At stage 310, multiple channel change requests have been received. The multiple channel change requests can be received, for example, by a reduced latency channel switching control logic (e.g., reduced latency channel switching control logic 250 of FIG. 2) or channel queuing module (e.g., channel queuing module 220 of FIG. 2). The multiple channel change requests can be identified from a channel queuing module of the CPE device.

At stage 315, a determination is made whether the multiple channel change requests have been buffered. The determination can be made based upon, for example, the reduced latency channel switching control logic (e.g., reduced latency channel switching control logic 250 of FIG. 2) polling a channel queuing module (e.g., channel queuing module 220 of FIG. 2). In some implementations, the reduced latency channel switching control logic can monitor the channel queuing module to determine if new requests are received while existing "join" message(s) remain queued.

If there are not multiple channel change requests queued, then at stage 325, the channel change requests are sent. The channel change requests can be sent, for example, by the reduced latency channel switching control logic (e.g., reduced latency channel switching control logic 250 of FIG. 2) in conjunction with an HFC interface (e.g., HFC interface 240 of FIG. 2). In some implementations, the channel change requests are in the form of "join" messages. The process 300 ends at stage 330.

If there are multiple channels change requests buffered, then at stage 320, the channel change requests are filtered. The channel change requests can be filtered, for example, by the reduced latency channel switching control logic (e.g. reduced latency channel switching control logic 250 of FIG. 2) in conjunction with a channel queuing module (e.g., channel queuing module 220 of FIG. 2). In some implementations, the channel requests can be filtered based on configuration settings. For example, according to some configuration settings, one or older "join" message(s) can be dropped from the queue and one or more remaining newer "join" message(s) can be sent. In some implementations, "join" message(s) can be intentionally delayed for a determined period of time to allow filter channel change requests to eliminate stale "join" message(s). The process 300 ends at stage 330.

Figure 4:
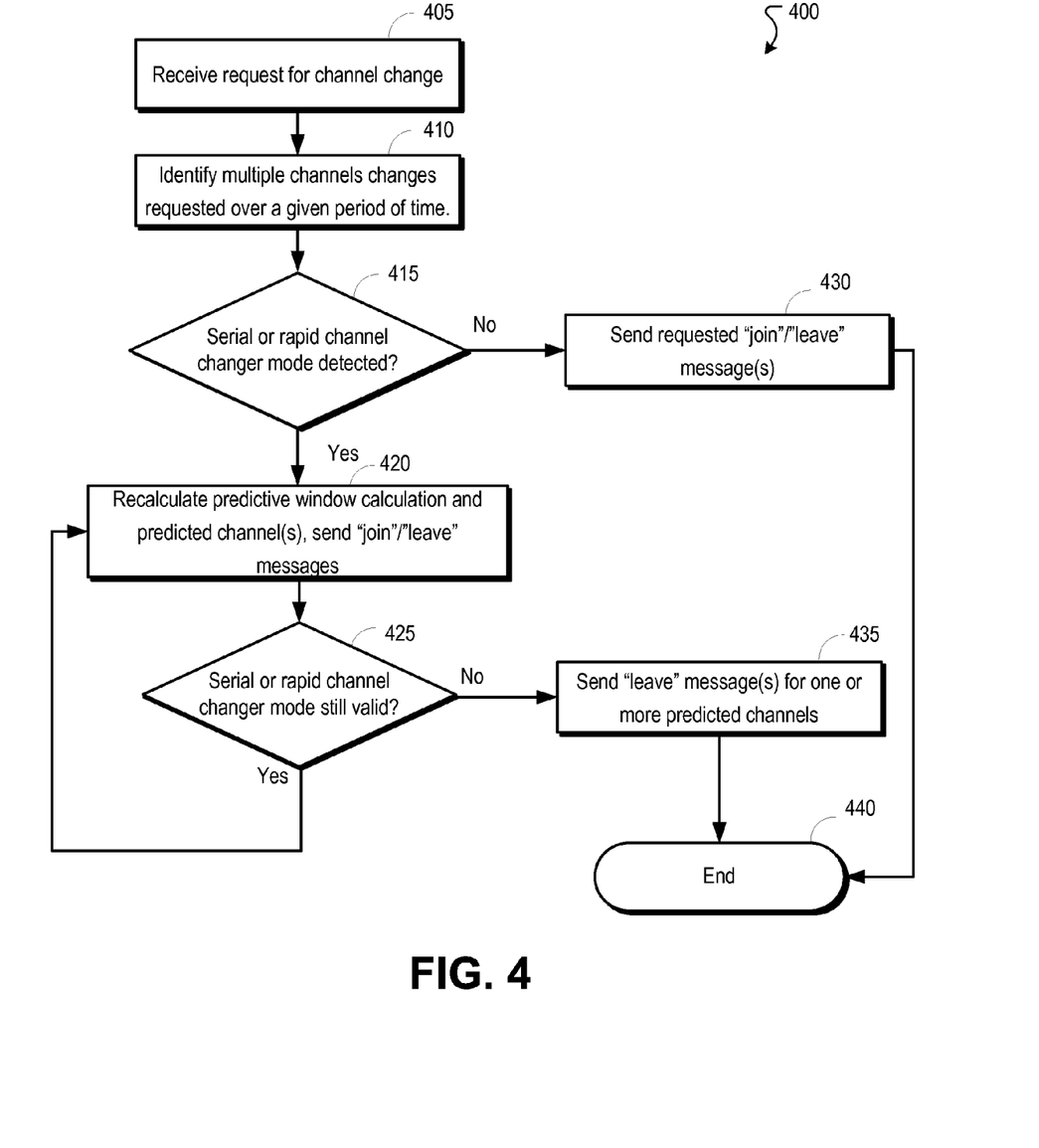
FIG. 4 is a flowchart illustrating an example process for providing reduced latency channel switching for IPTV.

FIG. 4 is a flowchart illustrating an example process 400 for providing predictive channel change requests. The process 400 can begin at stage 405 when a request for channel change is received. The request for a channel change can be received, for example, by a remote control interface (e.g., user channel control interface 230 of FIG. 2). In some implementations, the new channel request can be received by a remote control from the user, or at a network device, for example, by an external network interface.

At stage 410, multiple channel change requests over a period of time have been received. The multiple channel change requests can be received, for example, by a reduced latency channel switching control logic (e.g., reduced latency channel switching control logic 250 of FIG. 2) or channel queuing module (e.g., channel queuing module 220 of FIG. 2) of the CPE device. It should be understood that the filter channel change requests may still be applicable.

At stage 415, a determination is made whether a serial or rapid channel change mode is detected. The determination can be made based upon, for example, the ability of the reduced latency channel switching control logic (e.g., reduced latency channel switching control logic 250 of FIG. 2) to calculate an appropriate predictive window and predicted channels. In some implementations, the reduced latency channel switching control logic can continuously calculate the predictive window and predicted channels and await an alternative method of entering serial or rapid channel change mode. It should be understood that the predictive window calculation and predicted channels are the results of a serial or rapid channel change mode determination and can be identified prior to, or simultaneously with the detection of a serial or rapid channel change mode.

In some implementations, the predictive window calculations are based on the number of clicks by the user over a specified period of time. The predictive window allows the receiver to request a number of additional predicted channels based on the size of the predictive window. For example, a user who changes channels at two clicks per second may be able to request more predicted channels than a user who changes only one click per second.

In other implementations, channel prediction can be used to determine which additional channels to request. In some implementations, channel prediction can identify which adjacent predicted channels are retrieved and in what direction those channel are from the current channel. For example, if the user is pressing the "down" channel button rapidly, channel prediction can identify channel in the "down" channel direction and send one or more "join" messages for channels in the "down" channel direction.

In other possible implementations, the channel prediction can occur based a combination of recently viewed channels and/or frequency of viewed channels. It should be understood that in both the preceding cases, the number of channels requested can be determined by the predictive window calculation.

If there is neither serial nor rapid channel changer identified, then at stage 430, the "join" and/or "leave" messages are queued and sent in order. The channel change requests can be sent, for example, by the reduced latency channel switching control logic (e.g., reduced latency channel switching control logic 250 of FIG. 2) in conjunction with an HFC interface (e.g., HFC interface 240 of FIG. 2). In some implementations, the channel change requests are in the form of "join" messages. The process 400 ends at stage 440. It should be understood that the filter channel change requests may still be applicable even if a serial or rapid channel changer is not identified.

If a serial or rapid channel change mode is detected, then at stage 420, the predictive window and predicted channels are recalculated, and "join" and/or "leave" messages are sent to the SRM (e.g. system resource manager 130 of FIG. 1). In some implementations, the predictive window and predicted channels can be calculated once, continuously, or over a pre-programmed duration. Moreover, sending "join" and/or "leave" messages can also be performed once, continuously, or over a preprogrammed number of times.

At stage 425, a determination is made whether the user is still considered in serial or rapid channel changer mode. The determination can be made, for example, by the reduced latency channel switching control logic (e.g., reduced latency channel switching control logic 250 of FIG. 2) ascertaining whether the user has stopped at a predicted channel, changed behavior in unpredictable ways, or ceases serial or rapid clicking behavior. If the user has stopped at a channel for a certain period time, then "leave" messages are issued to all remaining channels at stage 435 and the user is no longer considered a serial or rapid channel changer until the behavior is detected again. The determination can be made based upon, for example, the ability of the reduced latency channel switching control logic (e.g., reduced latency channel switching control logic 250 of FIG. 2) to ascertain the cessation of serial or rapid channel change behavior. In some implementations, the reduced latency channel switching control logic may make the determination based on an inability to calculate an updated predictive window and/or predicted channels. In still further implementations, the reduced latency channel switching control logic can make the determination based on a specified duration that the user stays on a single channel. In other implementations, the user can remain in a serial or rapid channel changing mode at stage 425 even if the user has stopped at the predicted channel. In that case, other control determination can be used to retract the serial or rapid channel change mode status.

If serial or rapid channel changer mode is no longer valid, then at stage 435, the "leave" messages for the predicted channels are queued and sent. The "leave" messages can be sent, for example, by the reduced latency channel switching control logic (e.g., reduced latency channel switching control logic 250 of FIG. 2) in conjunction with an HFC interface (e.g., HFC interface 240 of FIG. 2). The process 400 ends at stage 450.

If serial or rapid channel changer mode is still valid, then the process returns to stage 420, where the predictive window and predicted channels are recalculated and "join" and/or "leave" messages are sent. For example, a "leave" message may be sent for a channel because the user has either skipped over a channel, is no longer considered a predicted channel, or can no longer be encompassed in predictive window. Moreover, a "join" message may be sent for a newly predicted channel or a larger recalculated predictive window. In some implementations, a continuously updating predicted channel and predictive window can cause some of the current channels to have less predictive value over other predicted channel. In this case, sending "join" and/or "leave" messages can also be performed once, continuously, or over a preprogrammed number of times until a the user has stopped at the predicted channel, predictive window or predicted channels cannot be calculated, or serial or rapid channel change behavior ceases.

Figure 5:
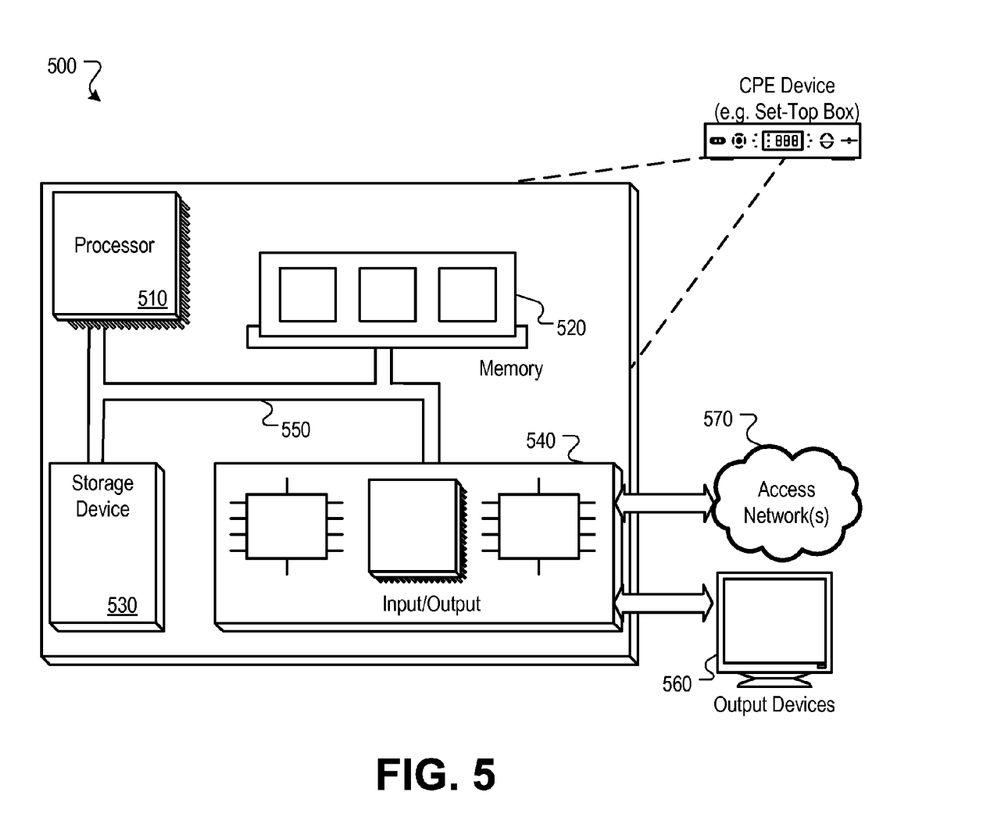
FIG. 5 is a block diagram of an example CPE device providing reduced latency channel switching.

FIG. 5 is a block diagram of an example CPE device that can include reduced latency channel switching control logic. However, it should be understood that many different kinds of network devices (e.g., including network hubs, bridges, routers, edge termination devices, etc.) can implement a reduced latency channel switching control logic mechanism. The device 500 can include a processor 510, a memory 520, a storage device 530, and an input/output device 540. Each of the components 510, 520, 530, and 540 can, for example, be interconnected using a system bus 550. The processor 510 is capable of processing instructions for execution within the device 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more CPE devices 560 (e.g., set top box, cable modem, etc.), as well as sending communications to, and receiving communications from a network 570. Other implementations, however, can also be used, such as mobile computing devices, mobile communication devices, set-top box television client devices, etc.

The network device (e.g., CMTS, EQAM, network router, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving a current channel change request from a user, the channel change request being received at a set top box;
   detecting that the user has entered a rapid channel change mode;
   based on detecting that the user has entered a rapid channel change mode, pre-tuning a predicted subsequent channel change at the set top box prior to actually receiving an actual subsequent channel change request;
   determining at the set top box that a plurality of channel change requests have been received but not executed, the plurality of channel change requests comprising the current channel change request and one or more previous channel change requests that have been buffered by the set top box;
   filtering the one or more previous channel change requests from the buffer at the set top box; and
   transmitting the current request for channel change without transmitting the one or more previous channel change requests.

2. The method of claim 1, further comprising:
   receiving a subsequent channel change request;
   if the current channel change request has not be acted upon, filtering the current channel change request;
   acting on the subsequent channel change request.

3. The method of claim 1, wherein the method is used in conjunction with an internet protocol television signal.

4. The method of claim 1, further comprising:
   if it is determined that no previous channel change requests are buffered, sending a join request for the current channel change request, the current channel change request being operable to cause a channel associated with an internet protocol television signal to be sent to a customer premise equipment device.

5. The method of claim 1, further comprising:
   speculatively identifying a series comprising at least one speculated subsequent channel change request based upon a history associated with the user, the at least one speculated subsequent channel change request including at least one channel;

pre-tuning the at least one channel prior to actually receiving an actual subsequent channel change request;
upon receiving the actual subsequent channel change request, determining that one of the at least one speculated subsequent channel change request matches the actual subsequent channel change request;
if one of the at least one speculated subsequent channel change requests matches the actual subsequent channel change request, providing a pre-tuned channel that matches the actual subsequent channel change request.

6. The method of claim 5, wherein speculatively identifying the series is based upon patterns of channel changes identified in the history associated with the user.

7. The method of claim 5, wherein speculatively identifying the series is based upon a genre of content associated with the current channel change request.

8. The method of claim 5, wherein speculatively identifying the series is based upon similar programming to the current channel change request.

9. The method of claim 5, further comprising timing the pre-tuning of channels such that the channels are not pre-tuned substantially before the user is expected to request the new channel.

10. The method of claim 9, wherein if a channel that is not pre-tuned before receiving an actual request for subsequent channel change, the speculated channel change request for that channel is dropped.

11. A computer-implemented method, comprising:
detecting that the user has entered a rapid channel change mode;
based on detecting that the user has entered a rapid channel change mode, prospectively predicting at a computing device a series comprising at least one predicted subsequent channel change request based upon a history, the at least one predicted subsequent channel change request including at least one channel;
pre-tuning the at least one channel at the computing device prior to actually receiving an actual subsequent channel change request;
receiving multiple successive channel change requests at the computing device;
filtering out the multiple successive channel change requests in favor of a most recent channel change request, the most recent channel change request comprising the actual subsequent channel change request;
upon receiving the actual subsequent channel change request at the computing device, determining that one of the at least one predicted subsequent channel change request matches the actual subsequent channel change request;
if one of the at least one predicted subsequent channel change requests matches the actual subsequent channel change request, providing a pre-tuned channel at the computing device that matches the actual subsequent channel change request.

12. The method of claim 11, wherein predicting the series is based upon patterns of channel changes identified in a personal history associated with the user.

13. The method of claim 11, wherein predicting the series is based upon a genre of content associated with the current channel change request.

14. The method of claim 11, wherein predicting the series is based upon similar programming to the current channel change request.

15. The method of claim 11, further comprising timing the pre-tuning of channels such that the channels are not pre-tuned substantially before the user is expected to request the new channel.

16. The method of claim 15, further comprising:
if a channel associated with the predicted series is not tuned prior to receiving the actual subsequent channel change request for that channel, the dropping the predicted request for that channel.

17. The method of claim 11, further comprising:
recalculating a predictive window for predicted subsequent channel change requests based upon detecting that the user has entered the rapid channel change mode.

18. The method of claim 11, wherein the predictive window is based upon how the user entered the rapid channel change mode.

19. A system, comprising:
a user channel control interface operable to receive channel change requests from a user;
a reduced latency channel switching control logic operable to interact with a channel queuing module to determine whether any previous channels change requests remain in a channel change queue;
a network interface operable to send a channel change request to one or more internet protocol television program sources and receive one or more internet protocol television programs in response to the channel change requests;
wherein the reduced latency channel switching control logic is operable to cancel one or more prior channel change requests in response to receiving a new channel change request.

20. The system of claim 19, wherein the one or more internet protocol television programs received from the one or more internet protocol television program sources includes the requested internet protocol television program and one or more predicted internet protocol television programs, the one or more predicted internet protocol television programs being based on an association between the one or more predicted internet protocol television programs and the requested internet protocol television program.

* * * * *